United States Patent [19]
Burton

[11] Patent Number: 5,299,982
[45] Date of Patent: Apr. 5, 1994

[54] SLIP JOINT SEAL FOR A DRIVESHAFT

[76] Inventor: Robert A. Burton, 3426 Bay Highland Dr., Green Bay, Wis. 54311

[21] Appl. No.: 745,552

[22] Filed: Aug. 15, 1991

[51] Int. Cl.5 ................................................ F16D 3/06
[52] U.S. Cl. .................................... 464/133; 464/162
[58] Field of Search ............... 464/172, 16, 183, 133, 464/157, 162

[56] References Cited

U.S. PATENT DOCUMENTS

| | | | |
|---|---|---|---|
| 1,496,236 | 6/1924 | Laughlin | 464/16 |
| 2,072,090 | 3/1937 | Anderson | 464/16 |
| 2,107,721 | 2/1938 | Swenson | 464/16 |
| 2,116,290 | 5/1938 | Spicer | 464/172 X |
| 2,239,192 | 9/1941 | Cutting | 464/133 X |
| 3,016,722 | 1/1962 | Batdorf | 464/16 |
| 3,123,990 | 3/1964 | Freeman | 464/16 |
| 3,633,383 | 1/1972 | Kleinschmidt | 464/16 |
| 3,942,336 | 3/1976 | Schultenkämper | 464/16 X |
| 4,125,000 | 11/1978 | Grob | 464/162 |
| 4,308,729 | 1/1982 | Condon | 464/16 |
| 4,379,707 | 4/1983 | Fisher | 464/162 |
| 4,592,556 | 6/1986 | Nieman et al. | 464/133 X |
| 4,819,755 | 4/1989 | Smemo et al. | 464/16 |

Primary Examiner—Daniel P. Stodola
Attorney, Agent, or Firm—Allen D. Gutchess, Jr.

[57] ABSTRACT

A slip joint seal for a driveshaft is between two universal joint yokes. A male splined shaft rotates with a first yoke and a female splined shaft rotates with a second yoke, with the two being mechanically engaged for slidable but nonrotational movement during operation of the driveshaft. A sealing sleeve extends from the first yoke around the male splined shaft and is of a larger diameter than the female splined shaft. The female splined shaft has a single, outwardly-facing, annular seal at its outer end, away from the second yoke, which seal engages the inner surface of the sealing sleeve. The female splined shaft also has a grease fitting for supplying grease to the shafts, with excess grease being capable of passing by the seal, which also acts as a wiper to remove contaminants within the sealing sleeve.

6 Claims, 1 Drawing Sheet

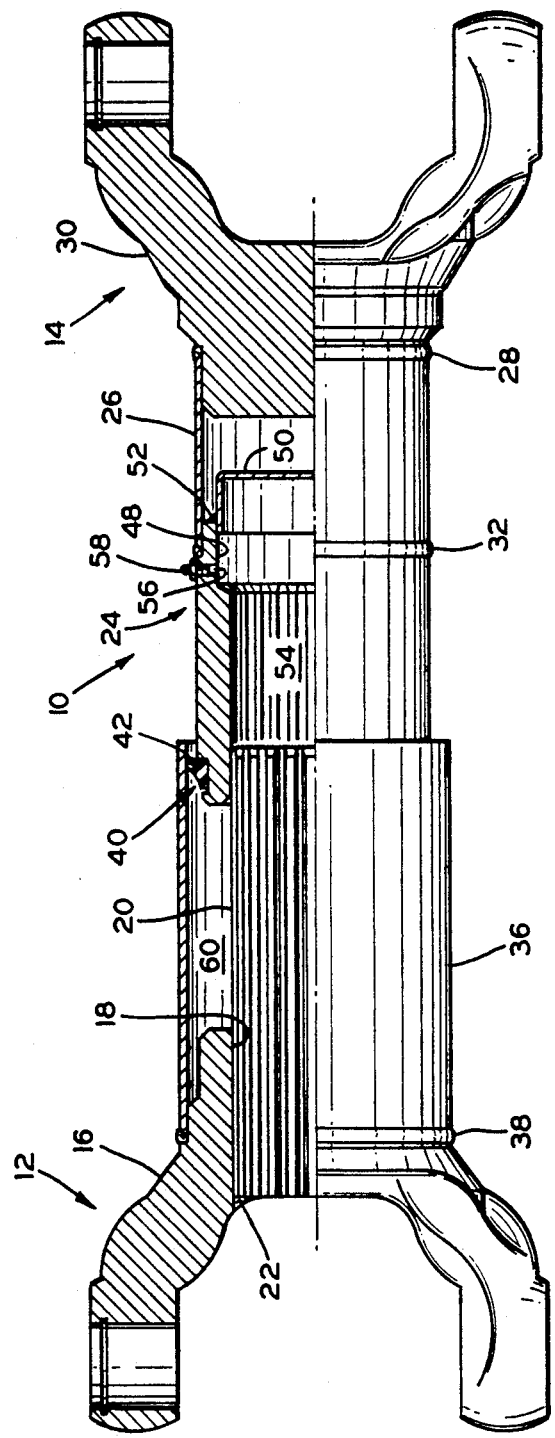
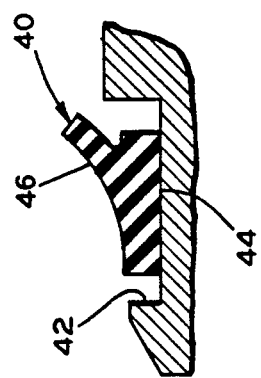
FIG. 1
FIG. 2

SLIP JOINT SEAL FOR A DRIVESHAFT

This invention relates to a grease seal for a slip joint of a driveshaft.

Slip joint seals have been long known in the art. The slip joint comprises male and female splined shafts which connect between two universal joint yokes. They are rotatably connected but can slide relative to one another to accommodate differences in length of the driveshaft during operation. Various seals have been employed to maintain grease between the splined shafts. With one common type of seal heretofore employed, the male splined shaft is exposed to the elements when the universal joints are at extended positions, with contaminants, including water, then being carried back between the two shafts as the driveshaft contracts. Other seals have been overly complex, and inefficient and/or tend to wear out relatively quickly.

The seal in accordance with the invention is used with a slip joint which is between two universal joint yokes in a driveshaft which contracts and extends during operation of a vehicle with which it is used. A male splined shaft extends rearwardly from a first universal joint yoke and rotates therewith. A female splined shaft extends rearwardly of a second universal joint yoke, rotates therewith, and is mechanically engaged for slidable but nonrotatable movement with the male splined shaft for all positions of the driveshaft and the yokes. A sealing sleeve extends rearwardly of the first universal joint yoke and rotates therewith, being suitably affixed thereto. The sealing sleeve has an outer diameter exceeding the outer diameter of the female splined shaft which extends into an annular chamber formed between the male splined shaft and the sealing sleeve. The sleeve also has a length which is substantially not less than the length of the male splined shaft. The female splined shaft carries a single, outwardly-facing, annular sealing ring in a groove, at its outer end away from the second universal joint yoke. The sealing ring includes a base band under tension in the groove, with an outwardly-extending lip slanting toward the second universal joint yoke and engagable with the inner surface of the sealing sleeve for all operational positions of the two universal joint yokes. The slanted lip enables excess grease in the annular chamber to pass by it and be expelled through an outer open end of the sleeve beyond the seal. The slanted lip also acts as a wiper to remove contaminants, including moisture, from the inner surface of the sealing sleeve when the driveshaft moves toward an extended position.

The female splined shaft has an inner annular recess at an end portion toward the second universal joint yoke and beyond internal splines thereof. A sealing cup is affixed to the female splined shaft, preferably in the annular recess. A grease fitting is also carried by the female splined shaft, preferably communicating with the annular recess between the internal splines and the sealing cup. Grease can then be supplied through the fitting into a cylindrical chamber of varying volumes between the outer end of the male splined shaft and the sealing cup, with the grease extending between the internal and the external splines and into the annular chamber around the male splined shaft beyond the outer end of the female splined shaft. The grease preferably is supplied to fill the chambers when the driveshaft is in a contracted position. Minimal excess grease will then be forced past the seal during operation of the driveshaft.

It is, therefore, a principal object of the invention to provide a seal for a slip joint of a driveshaft, which seal is more contaminant free.

Another object of the invention is to provide a seal for a slip joint of a driveshaft which employs a single sealing ring and is relatively simple in design and low in cost.

Yet another object of the invention is to provide a seal for a slip joint of a drive shaft which is less subject to wear and has a longer effective life.

Many other objects and advantages of the invention will be apparent from the following detailed description of a preferred embodiment thereof, reference being made to the accompanying drawings, in which:

FIG. 1 is a longitudinal view, half in elevation and half in longitudinal cross section, of a driveshaft employing a slip joint and a seal in accordance with the invention; and FIG. 2 is a greatly enlarged view of a sealing ring employed in the seal of FIG. 1.

Referring to the drawings, and more particularly to FIG. 1, a driveshaft embodying the invention is indicated at 10 and connects a first universal joint yoke 12 and a second universal joint yoke 14. The yokes can be of various designs to accommodate particular universal joint crosses of particular styles. The universal joint yoke 12 includes a hub 16 having an internally-splined central passage 18. A male splined shaft 20 extends rearwardly of the first yoke 12 and rotates therewith. In this instance, the splined shaft 20 is engaged with internal splines of the passage 18 and is welded at 22 to the hub 18. The splined shaft 20 is of predetermined length which can vary considerably from application to application. Other means can be employed to affix the shaft to the yoke and in some instances they can be structurally integral.

A female splined shaft 24 extends rearwardly of the second universal joint yoke 14 and rotates therewith. In this instance, the female splined shaft 24 is affixed to the yoke 14 through a propeller shaft or tube 26 which is welded at 28 to a solid yoke hub 30 and welded at 32 to an end portion of the female splined shaft 24. The length of the propeller shaft can vary considerably from application to application and, with shorter driveshafts, the female splined shaft 24 can be affixed directly to the hub 30 of the yoke 14.

The seal in accordance with the invention includes a sealing sleeve 36 extending rearwardly of the first universal joint yoke 12 and being rotatable therewith. In this instance, the sleeve 36 is affixed to the hub 16 of the yoke by a weld 38 at the end of the sleeve. The sealing sleeve 36 has an internal diameter exceeding the outer diameter of the female splined shaft 24 and has a length which is preferably not less than the length of the male splined shaft 20. In this manner, the splined shaft 20 will not be exposed and the outer end portion of the female splined shaft will always be within the sealing sleeve 36 for any operating position of the driveshaft 10.

The seal in accordance with the invention includes a sealing ring 40 carried in an external annular groove 42 at an outer end of the female splined shaft 24 opposite the second universal joint yoke 14. The sealing ring 40 includes an annular base band 44 and a lip 46 extending outwardly therefrom and slanting toward the second universal joint yoke 14. With this arrangement of the lip 46, excess grease can pass the lip 46 toward the open end of the sleeve 36. Further, when the driveshaft 10 is moving toward an expanded condition, the lip 46 is effective to wipe any contaminants off the inner surface of the sleeve 36, which is relatively clean and never exposed directly to the elements. The sealing ring 40 is somewhat resilient so that the base band 44 can be stretched over the end of the shaft 24 and resiliently held under tension in the bottom of the external groove 42. The resiliency also enables the lip 46 to maintain uniform contact with the inner surface of the sleeve 36. By way of example, the sealing ring 40 can be made of carboxylated nitrile material with a hardness in the order of eighty-five durometers (Shore A).

With the sealing ring 40 externally mounted on the shaft 24, it only contacts the inner surface of the sleeve 36 and is never in contact with a surface of a shaft which is sometimes exposed to the elements and on which contaminants and water can be deposited.

The female splined shaft 24 has an inner annular recess 48 at the end toward the yoke 14 beyond the internal splines. A sealing cup 50 has an annular flange press-fit in the recess 48 and welded at 52 to the shaft 24. A generally cylindrical chamber 54 is formed within the shaft 24 between an end of the male splined shaft 20 and the cup 50. A transverse bore 56 communicates with a portion of the annular recess 48 and the external diameter of the shaft 24. A grease fitting 58 is affixed in the bore 56 and can receive a supply of grease from a grease gun or the like. The grease is supplied into the generally cylindrical chamber 54 and is forced between the external and internal splines into an annular chamber 60 which is formed between the male splined shaft 20, the sleeve 36, an end of the hub 16, and the sealing ring 40. Preferably, the grease is initially supplied with the driveshaft 10 in a contracted position, with the volumes of the chambers 54 and 60 at minimal amounts. The combined volumes of the chambers 54 and 60 can provide five times the capacity of driveshaft seals heretofore commonly used.

The basic design of the seal in accordance with the invention is compatible with substantially any manufacturers' series of universal joints presently in use.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A driveshaft comprising a first universal joint yoke, a second universal joint yoke spaced at a varying distance from said first universal joint yoke when said driveshaft is in operation, a first shaft extending rearwardly of said first universal joint yoke and rotatable therewith, a second shaft extending rearwardly of said second universal joint yoke and rotatable therewith, said first shaft having external splines and said second shaft having internal splines which are in mechanical engagement for all operating positions of said first and said second universal joint yokes to enable slidable but nonrotatable movement between said shafts, said second shaft having a smooth cylindrical recess at the end toward said second universal joint yoke, means closing off an end portion of said second shaft closer to said second universal joint yoke, said means being affixed in said recess, a sleeve extending rearwardly of said first universal joint yoke and extending over at least a substantial portion of said first shaft, and having a diameter greater than an outer diameter of said second shaft, said sleeve extending around said first shaft and around an end portion of said second shaft away from said second universal joint yoke and having an open end away from said first universal joint yoke, a single, resilient seal carried by the end portion of said second shaft away from said second yoke, said seal having an annular lip facing outwardly and slanted toward said second universal joint yoke, said lip engaging an inner surface of said sleeve for all operating positions of said first and said second universal joint yokes, said lip enabling grease in an annular chamber formed between said first shaft and said sleeve to pass by said seal toward the open end of said sleeve, said lip serving to wipe contaminants off the inner surface of said sleeve when said first and said second universal joint yokes move away from one another, and a grease fitting in said second shaft spaced toward said second universal joint yoke from said seal, said grease fitting communicating with said recess.

2. A driveshaft according to claim 1 wherein said means for closing off the end portion of said second shaft is a cup having an edge portion affixed in said recess.

3. A driveshaft comprising a first universal joint yoke, a second universal joint yoke spaced at a varying distance from said first universal joint yoke when said driveshaft is in operation, a male splined shaft extending rearwardly of said first universal joint yoke and rotatable therewith, a female splined shaft extending rearwardly of said second universal joint yoke and rotatable therewith, said male and said female splined shafts being in mechanical engagement for all operating positions of said first and said second universal joint yokes, a tube having a diameter similar to the outer diameter of said female splined shaft, having one end affixed to an end of said female splined shaft nearer said second universal joint yoke, and having another end affixed to a hub of said second universal joint yoke, a cylindrical sleeve extending rearwardly of said first universal joint yoke and having a length substantially not less than the length of said male splined shaft, and having a diameter greater than the outer diameter of said female splined shaft, said sleeve extending around said male splined shaft and around an end portion of said female splined shaft away from said second universal joint yoke for all operating positions of said driveshaft, said sleeve having an open end away from said first universal joint yoke, said female splined shaft having an outwardly-facing, annular groove at the end portion away from said second universal joint yoke, a single, resilient seal, said seal having a base band under tension in said groove and having an annular lip extending outwardly and slanted toward said second universal joint yoke, said lip engaging an inner surface of said sleeve for all operating positions of said driveshaft, said lip enabling grease in an annular chamber formed between said male splined shaft and said sleeve to pass by said seal toward the open end of said sleeve, said lip serving to wipe contaminants off the inner surface of said sleeve when said first and said second universal joint yokes move away from one another, said female splined shaft having a smooth cylindrical recess at the end toward said second universal joint yoke and beyond internal splines therein, means for closing off the end portion of said female splined shaft closer to said second universal joint yoke, said closing off means being a cup having a flange affixed in said recess, and a grease fitting communicating with said recess, said cup being closer to said second universal joint yoke than said grease fitting.

4. A driveshaft comprising a first universal joint yoke, a second universal joint yoke spaced at a varying distance from said first universal joint yoke when said driveshaft is in operation, a male splined shaft extending rearwardly of said first universal joint yoke and rotatable therewith, a female splined shaft extending rearwardly of said second universal joint yoke and rotatable therewith, said male and said female splined shafts being in mechanical engagement for all operating positions of said first and said second universal joint yokes, means closing off an end portion of said female splined shaft closer to said second universal joint yoke, a sleeve extending rearwardly of said first universal joint yoke and rotatable therewith, said sleeve having a diameter greater than an outer diameter of said female splined shaft and extending around an end portion of said female splined shaft away from said second universal joint for all positions of said first and said second universal joint yokes, a single resilient seal carried by the end portion of said female splined shaft away from said second yoke, said seal engaging an inner surface of said sleeve for all operating positions of said first and said second universal joint yokes, said resilient seal having a base band received in an outwardly-facing groove in said female splined shaft, an annular lip extending outwardly and slanted toward said second universal joint yoke, said annular lip being integral with said base band, said lip enabling grease in an annular chamber formed between said male splined shaft and said sleeve to pass by said seal toward an open end of said sleeve, said lip serving to wipe contaminants off the inner surface of said sleeve when said first and said second universal joint yokes move away from one another, and a grease fitting in said female splined shaft spaced toward said second universal joint yoke from said seal, said grease fitting being farther away from said second yoke than said closing off means.

5. A driveshaft according to claim 4 wherein said female splined shaft has a smooth cylindrical recess facing inwardly at the end toward said second universal joint yoke, said means for closing off the end portion of said female splined shaft being affixed in said recess, and said grease fitting communicating with said recess.

6. A driveshaft according to claim 5 wherein said closing off means constitutes a cup having an annular flange affixed in said recess.

* * * * *